(No Model.) 2 Sheets—Sheet 1.

H. A. STOCK.
ELECTRIC MOTOR.

No. 578,069. Patented Mar. 2, 1897.

WITNESSES

INVENTOR
Harry A. Stock,
by E. E. Masson, Attorney.

(No Model.) 2 Sheets—Sheet 2.

H. A. STOCK.
ELECTRIC MOTOR.

No. 578,069. Patented Mar. 2, 1897.

WITNESSES
A. B. Digges
L. D. Heinrichs

INVENTOR
Harry A. Stock,
by E. E. Masson, Attorney.

UNITED STATES PATENT OFFICE.

HARRY A. STOCK, OF MILLERSBURG, PENNSYLVANIA.

ELECTRIC MOTOR.

SPECIFICATION forming part of Letters Patent No. 578,069, dated March 2, 1897.

Application filed April 15, 1896. Serial No. 587,708. (No model.)

*To all whom it may concern:*

Be it known that I, HARRY A. STOCK, a citizen of the United States, residing at Millersburg, in the county of Dauphin and State of Pennsylvania, have invented certain new and useful Improvements in Electric Motors, of which the following is a specification, reference being had therein to the accompanying drawings.

My invention relates to alternating-current electric motors, and has for its object a motor which will run with economy on a single-phase circuit. I accomplish this result by providing a motor which has a low self-induction and by preventing sparking at the brushes, as hereinafter described and claimed.

Figure 1:
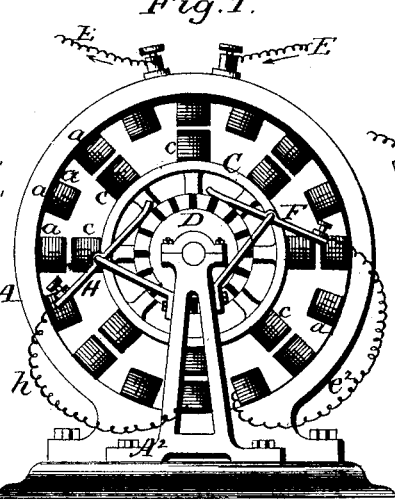
Figure 2:
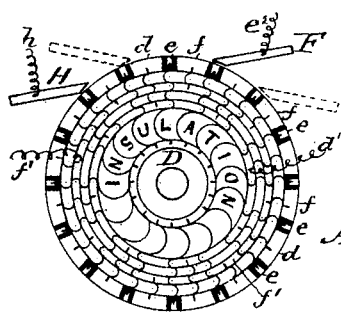
Figure 3:
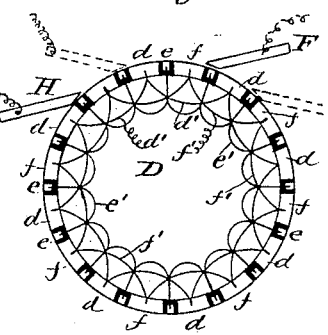
Figure 4:
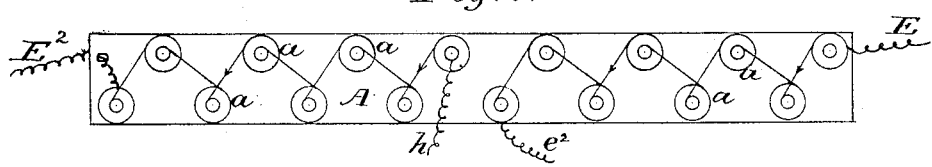
Figure 5:
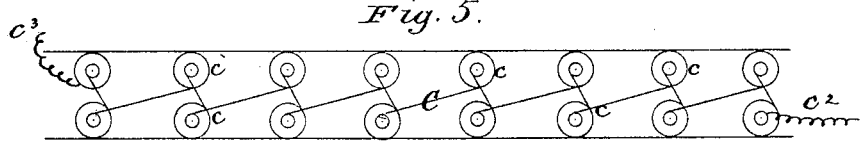
Figure 6:
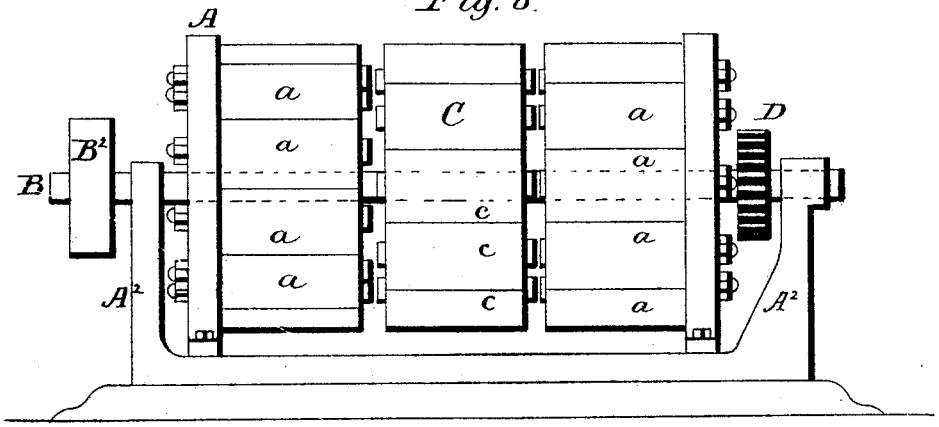
Figure 7:
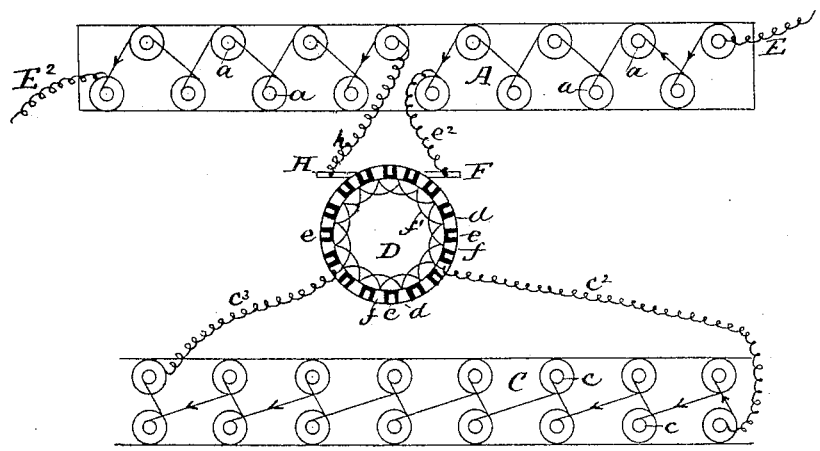
Figure 8:
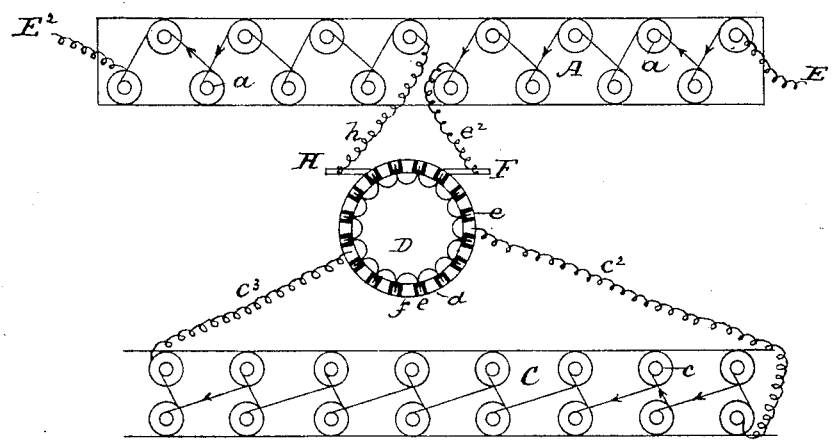

In the drawings, Figure 1 is an end elevation of my improved motor. Fig. 2 is a side view of the commutator and its connections. Fig. 3 is a diagram of the same, showing the connections in a simpler way. Figs. 4 and 5 are diagrams of the field and armature circuits, respectively. Fig. 6 is an elevation of a modified form of my improved motor. Fig. 7 is a general diagrammatic view of the whole machine, and Fig. 8 is a similar view showing the connections of the antisparking device.

In the drawings, A represents the frame of the motor, which is of any well-known form and carries alternately-arranged field-coils $a$, so wound as to produce the same polarity at all field-poles pointing inward and the opposite polarity on the outer rim of the frame. Said frame is provided with bearing-supports $A^2$ for the shaft B, which carries in turn the armature C. Said shaft carries a pulley $B^2$ to receive a belt by which power may be transmitted to the motor and also the commutator D, as usual.

To operate this motor, reference being had to Figs. 1, 4, 5, 7, and 8, the alternating current from any suitable source is received on the wire E and, entering the field-coils $a$, goes through one-half of them in series and passes out through the wire $e^2$ and thence to the brush F through the commutator D, as will be hereinafter described, and thence through the wire $c^2$ to the armature-coils $c$, wire $c^3$, commutator D, brush H, and wire $h$ to the other half of the field-coils $a$ in series, and thence to the line $E^2$.

In the field-magnet the field-poles are arranged in two sets in separate planes, the pole-pieces being staggered—that is to say, every other pole-piece is set back from the other—and the two sets are magnetically independent. Corresponding to this arrangement the armature is provided with two sets of pole-pieces, but instead of being staggered they are arranged side by side, so that only one set shows in Fig. 1. Both sets, however, appear in Figs. 4, 5, 7, and 8. While all of the poles on the field are shown as north, the two sets of armature-poles are of different polarity, as shown in Figs. 7 and 8. It is evident that the polarity of the field-magnet will be constantly changing in sign, while that on the armature is controlled and regulated by the commutator D. This commutator has three sets of bars $d$, $e$, and $f$. The bars $e$ are preferably smaller than the others and are connected with each other by the wires $e'$. The bars $d$ and $f$ are similar to each other and arranged alternately, and between each of the bars $d$ and $f$ is a bar $e$, which latter forms the antisparking arrangement to be hereinafter described. The bars $d$ are all connected together and the bars $f$ are similarly connected together, as shown in Figs. 2, 3, &c. In the practical form of construction shown in Fig. 2 a series of conducting-rings are separated from each other by a series of insulation-rings. The connecting-wires $e'$ of the small bars $e$ are all united to a conducting-ring within the ring marked "Insulation," and around said insulation-ring is a conducting-ring uniting the wires $d'$ of the wide bars $d$. This is surrounded by an insulating-ring and the latter in turn by a conducting-ring uniting together the wide bars $f$. Another insulating-ring separates this last conducting-ring from the commutator-segments.

The operation of the machine is as follows: The current passes through the whole machine in series, first through one half of the field-windings, then to the armature, through the commutator, and thence through the other half of the field-windings and out. All of the field-poles are, as before stated, of the same polarity at any instant, while the armature-poles are arranged in two sets in different planes, and each set is on a different polarity. While the pole-pieces of the armature are in line with the pole-pieces of the field—in other words, at the point of commutation—the armature is cut out of circuit by the brushes resting on the small bars e. At other times all of the poles are active. Like poles repel and unlike poles attract, and as each pole comes under the pole that is attracting or repelling it its polarity is reversed, as in a direct-current machine.

The staggered construction prevents deadpoints and tends to make the torque more uniform, as also the counter electromotive force, as while one set of poles come nearer to the poles on which they are acting the other set become more distant.

Sparking is avoided by cutting out the armature and putting it on open circuit at the point of commutation. This effectually prevents the short-circuiting under the brushes. While this is being done, the whole energy of the current in the machine goes to setting up the proper polarity in the field.

In Fig. 6 the principle is the same and the diagrams apply as well to this figure as to Fig. 1, so that further explanation of it is unnecessary.

It will be seen that in my improved motor I make use of field-magnets having one set of similar poles directed toward the armature, and thereby give rise to a set of free poles. My motor may then be called an "open magnetic-circuit machine." This tends to cut down the self-induction of the machine and allow the magnetism to follow the current more freely, while at the same time avoiding the well-known evils of self-induction in ordinary alternating-current motors. The sparking-preventer acts positively and thoroughly and does away with a great defect common to machines of this class.

It is evident that various changes in form and arrangement may be made without departing from the spirit of my invention, and I therefore claim as my invention and desire to secure by Letters Patent—

1. An alternating-current motor all of whose field-poles are at any instant of the same sign, in combination with two sets of armature-poles which at any given instant are of opposite signs, and coils wound on all of the said poles connected to a source of alternating current, substantially as described.

2. In an alternating-current motor, the combination of an armature, coils wound thereon, a field-magnet, coils wound on said field-magnet, and connections from all of the coils to a source of alternating current, the connections being so made that those of the field-poles which are directed toward the armature are at any given instant all of the same sign, but change their polarity from instant to instant, substantially as described.

3. In an alternating-current motor a field-magnet having poles arranged in two sets in different planes, the two sets being staggered, and an armature having poles arranged in two sets side by side, and not staggered, substantially as described.

4. In an alternating-current motor a field-magnet having poles arranged in two sets in different planes, the two sets being staggered, in combination with an armature having poles arranged in two sets side by side, and not staggered, and a commutator having two sets of bars alternately arranged, each set being connected together, substantially as described.

5. In an alternating-current motor, a field-magnet having poles arranged in two sets in different planes, the two sets being staggered, in combination with an armature having poles arranged in two sets side by side, and not staggered, and a commutator having active bars, and having a number of inactive bars, one between every pair of active bars, and an electrical connection between all of the inactive bars, substantially as described.

6. In an electric apparatus, the combination with a field-magnet and an armature of a commutator provided with a set of inactive bars and with two sets of active bars, all of the active bars in each set being connected together, and all of the inactive bars being connected together, and each set of active bars being connected to a different end of the armature-winding, substantially as described.

In testimony whereof I affix my signature in presence of two witnesses.

HARRY A. STOCK.

Witnesses:
S. W. COOPER,
R. O. NOVINGER.